US007022056B2

(12) United States Patent
Holopainen et al.

(10) Patent No.: US 7,022,056 B2
(45) Date of Patent: Apr. 4, 2006

(54) ROLL IN A PAPER OR BOARD MACHINE

(75) Inventors: Kari Holopainen, Muurame (FI); Jori Onnela, Jyväshylä (FI); Juha Lahtinen, Jyväskylä (FI); Ari Lehto, Leppävesi (FI)

(73) Assignee: Metso Paper, Inc., Helsinki (FI)

( * ) Notice: Subject to any disclaimer, the term of this patent is extended or adjusted under 35 U.S.C. 154(b) by 521 days.

(21) Appl. No.: 09/871,535

(22) Filed: May 31, 2001

(65) Prior Publication Data

US 2002/0010062 A1 Jan. 24, 2002

(30) Foreign Application Priority Data

May 31, 2000 (FI) ................................. 20001305

(51) Int. Cl.
*B29C 43/46* (2006.01)

(52) U.S. Cl. ............................................ 492/7; 492/20

(58) Field of Classification Search .................... 492/7, 492/16, 20

See application file for complete search history.

(56) References Cited

U.S. PATENT DOCUMENTS

| | | | | |
|---|---|---|---|---|
| 4,328,744 A | 5/1982 | Pav et al. | 100/162 B |
| 4,821,384 A * | 4/1989 | Arav | 492/5 |
| 5,197,174 A | 3/1993 | Lehmann | 492/7 |
| 5,860,903 A | 1/1999 | Niskanen | 492/20 |
| 6,409,644 B1 * | 6/2002 | Van Haag | 492/7 |

FOREIGN PATENT DOCUMENTS

| | | |
|---|---|---|
| DE | 19833308 | 2/2000 |
| FI | 100349 | 11/1997 |
| WO | 0005512 | 2/2000 |
| WO | 0049302 | 8/2000 |

* cited by examiner

*Primary Examiner*—Marc Jimenez
(74) *Attorney, Agent, or Firm*—Steinberg & Raskin, P.C.

(57) ABSTRACT

A method for fitting a tubular roll shell (2) of a roll (1) in a paper or board machine. In the method, the roll shell (2) is supported on a stationary roll shaft (3) by means of hydrostatic slide bearing elements (4*a*, 4*b*; 4*a'*, 4*b'*; 5*a*, 5*b*; 5*a'*, 5*b'*), acting on the roll shell (2) in radially opposite directions, at least in the direction of a plane co-directional with a first plane or a plane parallel to a primary loading (F) and in a plane substantially lateral to a plane co-directional with the primary loading (F). The slide bearing elements (4*a*, 4*b*, 4*a'*, 4*b'*, 5*a*, 5*b*, 5*a'*, 5*b'*) are loaded hydraulically by means of a pressure fluid. The lateral bearing elements (4*a*, 4*b*; 4*a'*, 4*b'*) acting in radially opposite directions have a hydrostatic pressure thereof adjusted by means of a regulator (20) having feedback connection with the main bearing elements (5*a*, 5*b*, 5*a'*, 5*b'*) acting in the direction of a plane co-directional with the primary loading (F) to comply at a predetermined ratio with the maximum hydrostatic pressure of the main bearing elements (5*a*, 5*b*, 5*a'*, 5*b'*) acting on the roll shell (2). The invention relates further to an apparatus for applying the method.

4 Claims, 3 Drawing Sheets

ROLL IN A PAPER OR BOARD MACHINE

FIELD OF THE INVENTION

The invention relates to a method for fitting the tubular roll shell of a roll in a paper or board machine with slide bearings, said method comprising supporting the roll shell on a stationary roll shaft by means of hydrostatic slide bearing elements acting on the roll shell in radially opposite directions at least in the direction of a plane co-directional with a primary loading and a plane substantially lateral to the plane co-directional with the primary loading, and said slide bearing elements being loaded hydraulically by means of a pressure fluid.

The invention relates also to a roll for applying the inventive method for fitting the tubular roll shell of a roll in a paper or board machine, in which method the roll shell is supportable on a stationary roll shaft by means of hydrostatic slide bearing elements acting on the roll shell in radially opposite directions at least in the direction of a plane co-directional with a primary loading and a plane substantially lateral to the plane co-directional with the primary loading, and said slide bearing elements being loadable hydraulically by means of a pressure fluid.

BACKGROUND OF THE INVENTION

In current rolls with slide bearings, a roll shell is supported on a roll shaft by means of hydrostatic slide bearing elements acting radially (also axially) on the roll shell and being loaded by means of a hydraulic pressure fluid. Generally, at least two of the slide bearing elements, so-called loading elements, act on the roll shell in directions opposite to each other in the direction of a plane co-directional with a primary loading. At least two of the slide bearing elements, so-called lateral bearing elements, act on the roll shell in a direction lateral to a plane co-directional with the primary loading. This configuration is described in patent publication F1 98320. There, when an external force, for example a force resulting from a nip load, is applied to a roll shell and, thus, to loading elements, a regulator, for example a slide-type valve, mechanically in connection with the loading elements, is used for adjusting the pressure prevailing in the cavity of a slide bearing element closer to a higher loading to surpass the pressure of a loading element acting in the opposite direction so as to offset the external forces. A similar arrangement is implemented for lateral bearing elements, as well. Each slide bearing element is supplied with a constant pressure by way of regulators.

It is also prior known to support a roll shell in its middle section for the adjustment of a nip load by means of several, at least two counter zones. For such arrangement, reference can be made to patent publication FI 98554. There, the inner surface of a roll shell is subjected to the action of counter zone elements/chambers set e.g. in two rows, which produce a sum force working in a nip plane in a direction substantially opposite to the force produced by a loading element.

However, the above-described arrangement is solely intended to prevent a displacement or stroke of the roll shell relative to the shaft. Heavy bearing loads become a problem in this arrangement. Subjected to such loads, the roll shell tends to turn elliptical as a result of the action of loading elements, even though the roll shell would otherwise remain essentially stationary. If the ellipticity development is not stopped, the stresses in a shell may become so severe that the shell could break as a result of fatigue.

OBJECTS AND SUMMARY OF THE INVENTION

It is an object of the present invention to provide a roll fitted with slide bearings, which is substantially capable of overcoming the foregoing drawbacks.

In order to achieve this, a method of the invention is principally characterized in that the hydrostatic pressure of lateral bearing elements acting in radially opposite directions on a roll shell in a direction substantially lateral to a plane co-directional with primary loading is adjusted by means of a regulator having feedback connection from the main bearing elements acting in the direction of a plane co-directional with primary loading to comply at a predetermined ratio with the maximum hydrostatic pressure of the main bearing elements acting on the roll shell.

On the other hand, a roll for applying the method is characterized in that the hydrostatic pressure of lateral bearing elements acting in radially opposite directions on a roll shell in a direction substantially lateral to a plane co-directional with primary loading is adjustable by means of a regulator having feedback connection from the main bearing elements acting in the direction of a plane co-directional with primary loading to comply at a predetermined ratio with the maximum hydrostatic pressure of the main bearing elements acting on the roll shell.

The invention provides substantial benefits over prior art slide bearing assemblies. The discussed slide bearing assembly enables a roll shell not to become elliptical or its degree of ellipticity will be just slight compared with slide bearing assemblies of the prior art. This is possible in such a way that, in addition to the delivery of a constant pressure, each lateral bearing element is supplied, if necessary, with a pressure proportional at a certain ratio to the maximum pressure prevailing in the cavities of slide bearing elements acting in the direction of a plane co-directional with primary loading. This in turn is accomplished in such a way that the regulator receives a control signal either mechano-hydraulically or electrically from the maximum pressure prevailing in the cavity of any of the foregoing slide bearing elements.

BRIEF DESCRIPTION OF THE DRAWINGS

The invention will now be described by way of example with reference made to the accompanying drawings, in which.

DETAILED DESCRIPTION OF THE INVENTION

Figure 1:
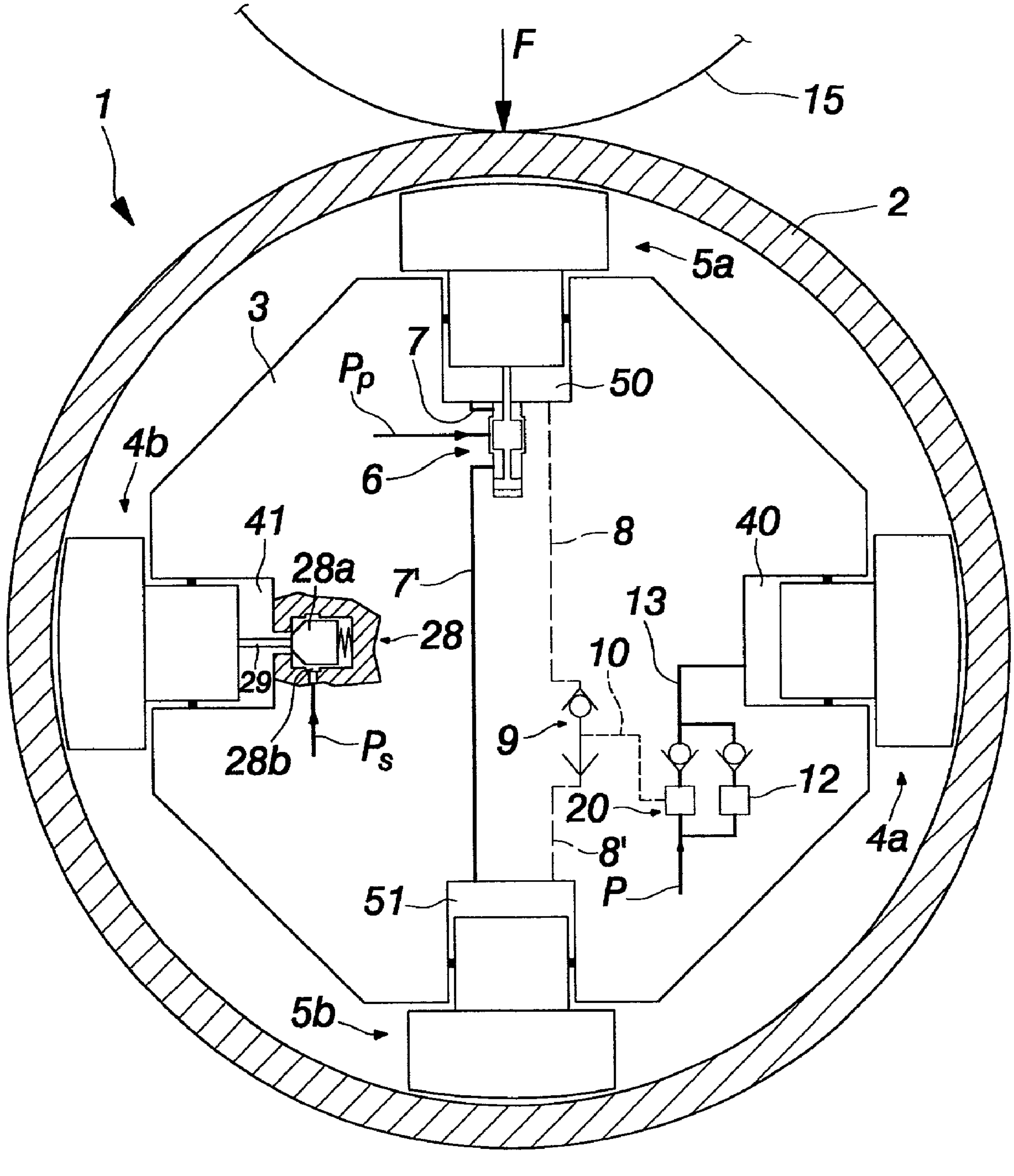
FIG. 1 shows a slide bearing assembly for a roll of the invention in a schematic end view.

FIG. 1 shows schematically one preferred embodiment of the invention, in which the roil is designated with reference numeral 1. The roil 1 includes a stationary shaft 3, around which is mounted a shell 2 of the roll 1. The roll shell 2 is supported on the shaft 3 by means of hydrostatic slide bearing elements 4*a*, 4*b* and 5*a*, 5*b* acting on an inner surface of the roll shell 2 in radially opposite directions. The slide bearing elements 5*a* and 5*b* or main bearing elements are mounted on the shaft 3 in the direction of a plane which is co-directional with a primary loading F. The slide bearing elements 4*a* and 4*b* or lateral bearing elements are set in the direction of a plane which is lateral to the plane co-directional with the primary loading F. It is obvious that main bearing elements as well as lateral bearing elements can be mounted on the shaft in higher numbers, e.g. as twin elements or in groups of three.

The supply of a hydrostatic pressure fluid to the main bearing elements 5*a* and 5*b* is prior known. In other words, for example the loading F developed by a counter roll 15 upon the roll shell 2 strives to move the roll shell 2 as well as the main bearing elements 5*a* and 5*b* relative to the shaft 3. Thus a valve 6, fitted mechanically in connection with the element 5*a*, can be used for adjusting in cavities 50 and 51 the pressure of a hydraulic pressure fluid delivered through a constant pressure feed line $P_P$ as well as feed lines 7, 7' as required, such that the roll shell 2 remains substantially stationary in the direction of a plane co-directional with the loading F.

The lateral bearing element 4*a* is provided with separate feed lines P and 13. Between the feed fines P and 13 is arranged a regulator 20. The lateral bearing element 4*b* is also provided with a separate regulator 28, which is supplied with a hydraulic pressure fluid along a constant pressure feed line $P_S$, and by way of the regulator 28 further into a cavity 41 of the lateral bearing 4*b*.

Figure 2:
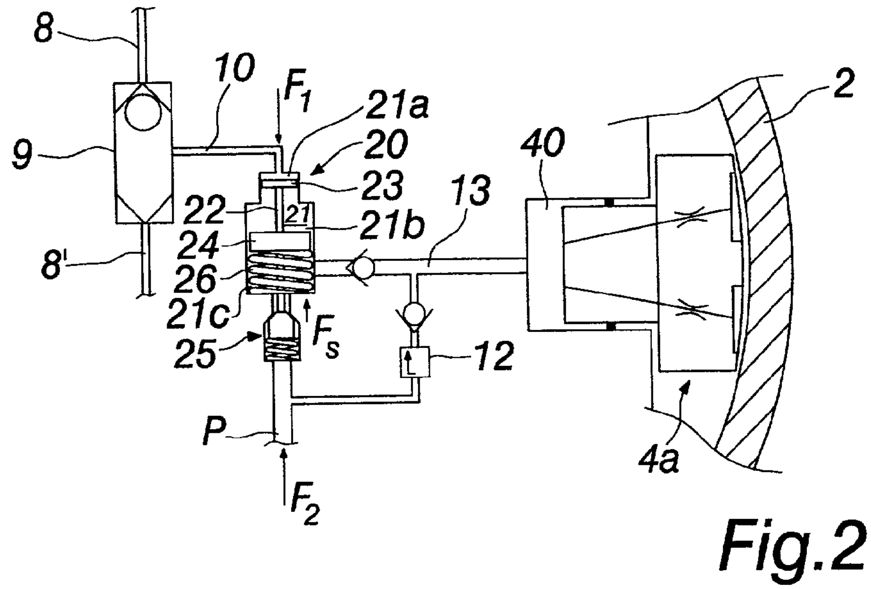
FIG. 2 shows a regulator according to the embodiment of FIG. 1 in a schematic structural view.

The regulator 20 has its construction depicted schematically in FIG. 2. The regulator 20 comprises a mechano-hydraulic slide valve, which is functionally similar to a pressure recovery valve, having a constant pressure on the inlet side, the pressure ratio between the control side and the outlet side being constant. The valve 20 includes a cylindrical space 21, which is smaller at a first end than at a second end in terms of its diameter. The cylindrical space 21 is provided with a valve stem 22 for a lengthwise movement in the space 21. The valve stem 22 is fitted with two slides 23 and 24 for dividing the cylindrical space 21 for three isolated smaller spaces 21*a*, 21*b*, 21*c*. The first slide 23 is mounted on the end of the valve stem 22 in the diametrically smaller cylindrical space 21*a*. The second slide 24 is fitted in connection with the valve stem 22 in the diametrically larger cylindrical space 21*b*, 21*c*. The valve stem 22 has its second end provided with an actual regulator element 25 which, as the valve stem 22 is reciprocating, opens and closes a constant pressure feed line P which is in communication with the valve 20.

A control pressure for the valve stem 22 is introduced above the slide 23 into the cylindrical space 21*a* by way of feed lines or transit paths 8, 8' and 10. The feed line 8 is in communication with the cavity 50 of the main bearing element 5*a* for bringing a pressure signal along the feed line 8 to a shuttle valve 9. Furthermore, the feed line 8' is in communication with the cavity 51 of the main bearing element 5*b* for bringing a pressure signal along the feed line 8' to the shuttle valve 9. By virtue of the shuttle valve's 9 action, a higher-pressure signal can be delivered along a feed line 10 to the valve 20. For example, when the counter roll 15 applies a loading force on the roll shell 2, the cavity 50 of the main bearing element 5*a* by virtue of the action of the valve 6 develops a higher hydrostatic pressure than the cavity 51 of the main bearing element 5*b*. The hydrostatic pressure working within the main bearing element 5*a* becomes so high that the roll shell 2 tends to "stretch" in the direction of a plane co-directional with the primary loading F, and to "flatten" in the direction of a plane lateral to the above-mentioned plane. Consequently, the feed line 8 carries a higher active pressure than the feed line 8', as a result of which, by virtue of the shuttle valve's 9 action, the cylindrical space 21*a* carries a control pressure consistent with the maximum hydrostatic pressure prevailing in the cavity 50, thus having an effect on the action of the valve 20 and the slide 23, and hence, on the action of the valve stem 22.

Upon receiving a control signal along the feed line 10 on the top surface of the slide 23, the valve 20 will be essentially subjected to a force $F_1=P_{max}/A_1$, wherein $P_{max}$ represents a pressure consistent with the maximum hydrostatic pressure prevailing in the cavity 50 of the main bearing element 5*a* or in the cavity 51 of the main bearing element 5*b*, and A, represents a surface area of the slide 23. When the force F, is more powerful than a counterforce F, produced by a counter spring 26 present in the valve 20, the valve stem 22 makes a move as the valve 24 compresses the spring 26. At the same time, the regulator element 25, accompanying the valve stem 22 in its movement, shifts to a position to open a flow path from the constant pressure feed line P to the regulator 20, and thence further to a feed line 13 which is in communication with the cavity of the lateral bearing 4*a*.

The opening of a flow path results in an increase or development of pressure in the space 21*c* above the slide 24, which in turn produces a force $F_2=P_2/A_2$ which is counter-active with respect to the force F, and contributes to the actions of the valve stem 22 and in which $P_2$ represents a pressure working in the space 21*c* of the valve 20 on the slide 24, and $A_2$ represents a surface area of the slide 24.

The valve stem 22, along with its slides 23 and 24, searches for its position until the forces $F_1$ and $F_2$ attain an equal rate. Compared to the forces $F_1$ and $F_2$, the force $F_S$ of the spring 26 is substantially insignificant and, thus, need not be accounted for. In a balanced condition, the pressure $P_{max}$ prevailing in the space 21*a* above the slide 23 in relation to the pressure $P_2$ prevailing in the space 21*c* above the slide 24 is always proportional to a ratio between the surface areas $A_1$ and $A_2$. Hence, a pressure prevailing in the feed line 13 between the valve 20 and the cavity 40 and in the cavity 40 is equal to that prevailing in the valve space 21*c*. As the control pressure $P_{max}$ changes, there will also be a change, as the valve stem 22, and hence the slide 24, are moving, in the pressure $P_2$ of a pressure fluid acting in the space 21*c* in accordance with the above-mentioned area ratio. Preferably, the area ratio is defined in such a way that $P_2$ is about 0.5–0.8 times with respect to $P_{max}$. However, the multiplier can be lower or higher as necessary.

When the valve 20 is closed, a holding pressure of the lateral bearing element 4*a* as well as lubrication between the lateral bearing element 4*a* and an inner surface of the roll shell 2 are secured by means of a separate feed line, fitted with a pressure reducer valve 12 and connected to the feed line 13 which is in communication with the cavity 40.

Furthermore, FIG. 1 visualizes a valve assembly for the lateral bearing element 4*b* acting on the roll shell 2 in a radially opposite direction for supplying a hydraulic pressure fluid to the lateral bearing element 4*b*. The lateral bearing element 4*b* is in a mechanical connection by way of a spindle rod 29 with a slide 28*a* of a valve 28. Thus, as a result of the action of the lateral bearing element 4*a*, the roll shell 2 shifts to the right according to FIG. 1 for a contact with the lateral bearing element 4*b*, which uses the spindle rod 29 to drive the slide 28*a* of the valve 28 out of its position in front of a port 28*b*. Thus, the feed line $P_S$ is provided with a clear flow path through the valve 28 into the cavity 41 of the lateral bearing element 4*b*. The element 4*b*, and thus the slide 28*a*, travels a short distance until the port 28*b* opens sufficiently for pressures in both cavities 40 and 41 of the lateral bearing elements 4*a* and 4*b* to become equal for holding the roll shell 2 in lateral direction substantially stationary and for preventing a lateral flattening of the roll shell 2.

Figure 3:
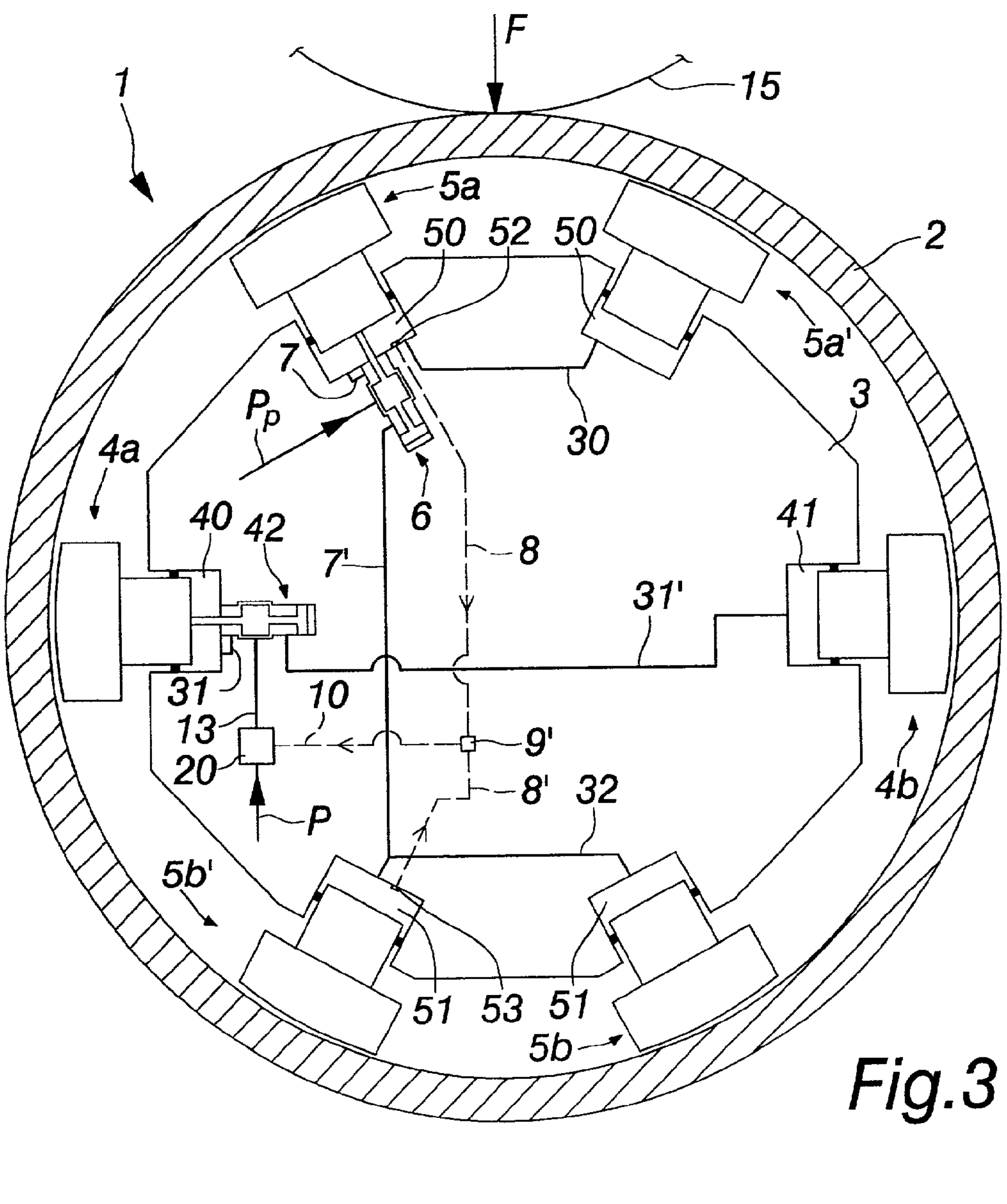
FIG. 3 shows a second embodiment of the invention in a schematic end view.

FIG. 3 illustrates a second embodiment of the invention. A shaft 3 is provided with two main bearing elements 5*a*, 5*a*', set at a distance from each other in a direction radial with respect to the direction of a plane substantially co-directional with a primary loading F, and acting on the inner surface of a roll shell 2. Respectively, the shaft 3 is provided with two main bearing elements 5*b*, 5*b*' acting on the inner surface of the roll shell 2 in radially opposite directions. The shaft 3 is further provided with lateral bearing elements 4*a* and 4*b*, acting in radially opposite directions on the inner surface of the roll shell 2 in a direction lateral to a plane co-directional with the primary loading F.

The supply of a hydraulic pressure fluid to the main bearing elements 5*a*, 5*a*' and 5*b*, 5*b*' is prior known in its basic principles and only briefly reviewed here. The hydraulic pressure fluid is brought along a feed line $P_P$ to a valve 6, whereby the pressure fluid is delivered further along lines 7 and 7' into cavities 50 and 51 of the elements 5*a* and 5*b*' and still further along feed lines 30 and 32 into respective cavities 50 and 51 of the elements 5*a*' and 5*b*. The pressure fluid is also brought along feed lines P and 13 to a valve 42, whereby the hydraulic pressure fluid is delivered along lines 31 and 31' into cavities 40 and 41 of the elements 4*a* and 4*b*.

Between the feed lines P and 13 is fitted an electrically controlled regulator 20, for example an electrically controlled valve, which is prior known regarding its design and operation. As in the previous embodiment, a control signal for the regulator 20 is consistent with the maximum pressure prevailing in the cavities 50 or 51 of the main bearing elements 5*a*, 5*a*' or 5*b*, 5*b*'. The control signal is produced e.g. by fitting the cavities 50 and 51 with pressure detectors 52 and 53. The pressure-consistent electrical signal received therefrom is carried along an electrical transit path 8, 8' to a signal reversing switch 9'. The switch 9' is intended to distinguish from the two signals received from the transit path 8, 8' the one that is consistent with the higher pressure, and to transmit it further along a transit path 10 to the regulator 20. The regulator 20 opens or closes in compliance with the pressure-consistent signal received in the regulator 20, such that the pressure fluid supplied through the feed line 13 and the valve 42 and prevailing in the cavities 40 and 41 has a pressure which is about 0.5–0.8 times the maximum hydrostatic pressure prevailing in the cavities 50 and 51 of the main bearing elements 5*a*, 5*a*' or 5*b*, 5*b*'. However, this multiplier can be lower or higher, even higher than 1.

Figure 4:
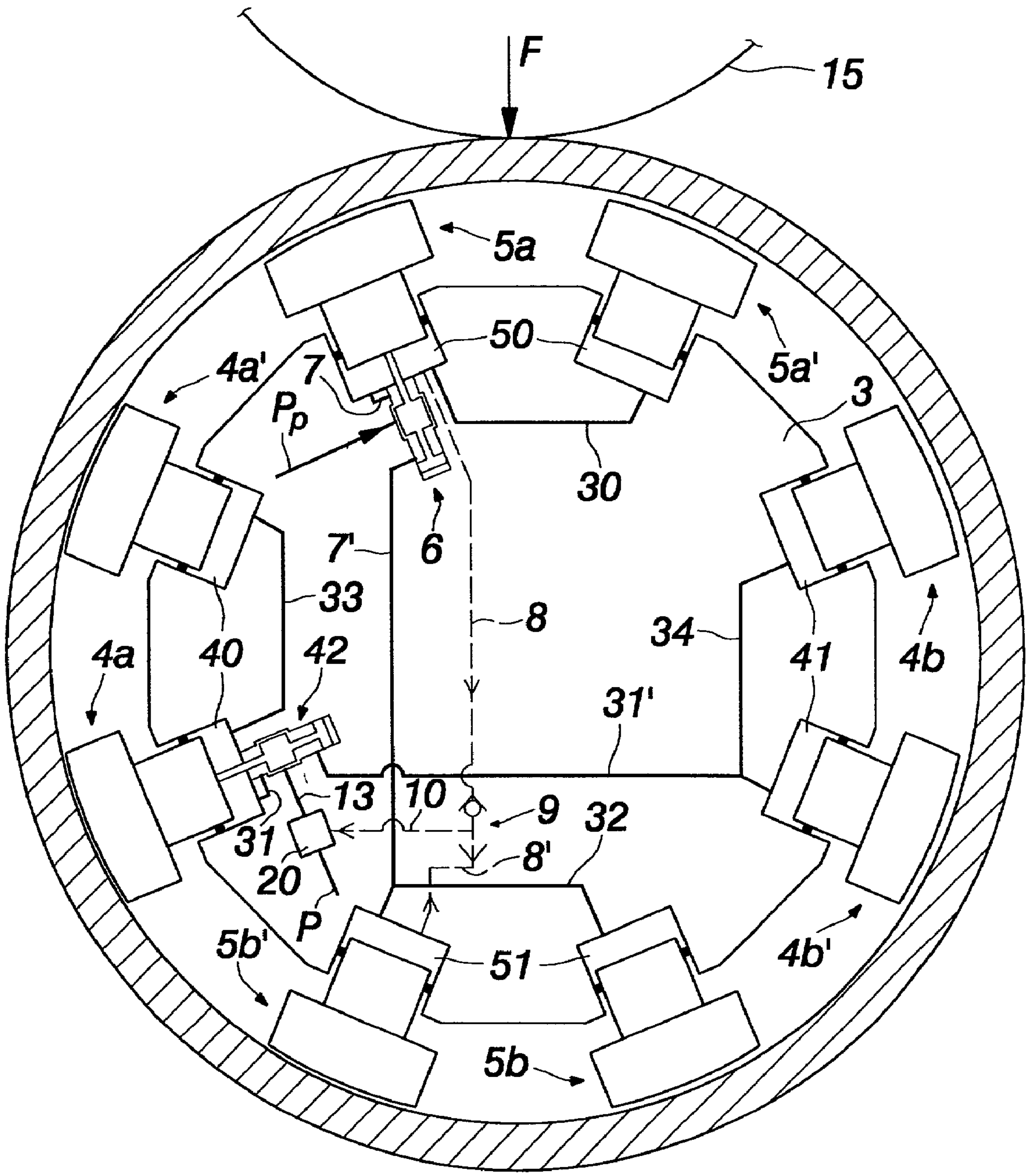
FIG. 4 shows a third embodiment of the invention in a schematic end view.

FIG. 4 shows yet another, a third embodiment of the invention. As compared to the second embodiment, a single lateral bearing element is replaced with two radially spaced-apart pairs of lateral bearing elements 4*a*, 4*a*' and 4*b*, 4*b*'. The elements 4*a* and 4*a*' are in communication with each other by way of a feed line 33 used for supplying a pressure fluid from a cavity 40 of the element 4*a* into a respective cavity 40 of the element 4*a*. The elements 4*b* and 4*b*' are similarly in communication with each other by way of a feed line 34. Another difference between this arrangement and the previous one is that the regulator 20 is functionally a pressure-controlled mechano-hydraulic valve similar to the one described in connection with the first embodiment. The pressure regulation of a pressure fluid delivered to a regulator 42 is naturally implementable also electrically, as set forth in connection of the second embodiment. The number of slide bearing elements can also be varied as necessary.

The invention claimed is:

1. A roll in a paper or board machine, said roll comprising:

a tubular roll shell (2) being supportable on a stationary roll shaft (3) by means of hydrostatic slide bearing elements (4*a*, 4*b*; 4*a*', 4*b*'; 5*a*, 5*b*; 5*a*', 5*b*') acting on the roll shell (2) in radially opposite directions at least in the direction of a first plane or a plane co-directional with a primary loading (F) and a plane substantially lateral to the plane co-directional with the primary loading (F), said slide bearing elements (4*a*, 4*b*, 4*a*', 4*b*', 5*a*, 5*b*, 5*a*', 5*b*') being loadable hydraulically by means of a pressure fluid, further comprising:

a regulator (20) for adjusting a hydrostatic pressure of lateral bearing elements (4*a*, 4*b*; 4*a*', 4*b*') acting in radially opposite directions on the roll shell (2) in a direction substantially lateral to a plane co-directional with the primary loading (F), said regulator (20) having feedback connection from main bearing elements (5*a*, 5*b*, 5*a*', 5*b*') acting in the direction of a plane co-directional with the primary loading (F) to comply with a predetermined ratio with maximum hydrostatic pressure of the main bearing elements (5*a*, 5*b*, 5*a*', 5*b*') substantially acting on the roll shell (2); said regulator (20) comprising a mechanical hydraulic valve which further comprises:

a cylindrical space (21) diametrically smaller at one end than at the other end;

a valve stem (22) adapted to be axially movable lengthwise in the cylindrical space (21);

two slides (23, 24) fitted in the cylindrical space (21) in connection with the valve stem (22), a first (23) of said slides being mounted on a first end of the valve stem (22) in a diametrically smaller cylindrical space (21*a*), and a second (24) of said slides, which is provided with a spring (26), being mounted, in connection with the valve stem (22), in a diametrically larger cylindrical space (21*b*, 21*c*), whereby a pressure fluid is suppliable to at least one lateral bearing element (4*a*, 4*a*' 4*b*, 4*b*'); and a regulator element (25), which is fitted in connection with a second end of the valve stem (22) as well as in connection with a feed line (P) for a hydraulic pressure fluid, and that the first slide (23) is subjectable to a hydrostatic control pressure consistent with a hydrostatic pressure acting on hydrostatic slide bearing elements (5*a*, 5*a*', 5*b*, 5*b*') which work against the spring (26) and act on a roll shell (2) in a plane co-directional with a primary loading (F) for operating the valve stem (22) and the regulator element (25) in such a way—that the hydraulic pressure fluid has access from the feed line (P) into the larger cylindrical space (21*b*, 21*c*) of the valve (20) in view of regulating a supply pressure delivered to at least one lateral bearing element (4*a*, 4*a*' 4*b*, 4*b*').

2. A roll as set forth in claim 1, wherein one of said lateral bearing elements (4*b*, 4*b*') is suppliable with a constant pressure and another of said lateral bearing elements (4*a*, 4*a*') is suppliable by way of a regulator (20) with a control pressure depending on the maximum pressure of the main bearing elements (5*a*, 5*b*, 5*a*', 5*b*').

3. A roll as set forth in claim 1, wherein the regulator (20) comprises:

an electrically controlled valve, said electrically-controllable valve obtaining a control from one of a pair of pressure detectors (52, 53) located along a transit path (8, 8', 9', 10) established between the pressure detectors (52, 53) and the regulator (20), said electrically-controlled valve being mounted in connection with the main bearing elements (5a, 5a', 5b, 5b') acting on the roll shell (2) in the direction of a plane co-directional with the loading (F).

4. A roll as set forth in claim 1, wherein the regulator (20) is connected with a feed line (P) of one lateral bearing element (4a), said one lateral bearing element (4a) being further provided with a control device (42) for delivering a hydraulic pressure to another opposite lateral bearing element (4b), wherein the shell remains laterally immobilized relative to the roll shaft (3).

* * * * *